(12) United States Patent
Kim et al.

(10) Patent No.: US 9,195,273 B2
(45) Date of Patent: Nov. 24, 2015

(54) DETACHABLE DUAL MOBILE TERMINAL

(71) Applicant: LG ELECTRONICS INC., Seoul (KR)

(72) Inventors: Kyoungtae Kim, Seoul (KR); Inkuk Yeo, Seoul (KR); Sungkwon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 14/017,991

(22) Filed: Sep. 4, 2013

(65) Prior Publication Data

US 2014/0218314 A1 Aug. 7, 2014

(30) Foreign Application Priority Data

Feb. 1, 2013 (KR) .......................... 10-2013-0011662

(51) Int. Cl.
| | |
|---|---|
| *G06F 1/16* | (2006.01) |
| *H04M 1/673* | (2006.01) |
| *H04M 1/725* | (2006.01) |
| *G06F 3/0488* | (2013.01) |
| *G06F 21/36* | (2013.01) |
| *H04M 1/02* | (2006.01) |

(52) U.S. Cl.
CPC ............ *G06F 1/1654* (2013.01); *G06F 1/1692* (2013.01); *G06F 3/04883* (2013.01); *H04M 1/673* (2013.01); *H04M 1/72527* (2013.01); *G06F 21/36* (2013.01); *H04M 1/0256* (2013.01); *H04M 2250/12* (2013.01)

(58) Field of Classification Search
CPC ........... G06K 19/0723; G06K 19/0727; G06F 3/041; G06F 3/0416
See application file for complete search history.

(56) References Cited

U.S. PATENT DOCUMENTS

2011/0070827 A1* 3/2011 Griffin et al. ................. 455/41.1
2011/0282785 A1* 11/2011 Chin ............................... 705/42

* cited by examiner

*Primary Examiner* — Kevin Nguyen
(74) *Attorney, Agent, or Firm* — Birch, Stewart, Kolasch & Birch, LLP (57) ABSTRACT

A detachable dual mobile terminal including a first mobile terminal having a first display unit; a second mobile terminal having a second display unit; a coupling portion provided to couple or detach the first and second mobile terminals; a coupling sensor configured to sense whether the first and second mobile terminals are coupled or detached; and a controller included in each of the first and second mobile terminals and configured to unlock at least one of the first and second mobile terminals when an unlocking a code is input and when the coupling sensor senses the first and second mobile terminals are coupled to each other.

16 Claims, 12 Drawing Sheets

DETACHABLE DUAL MOBILE TERMINAL

Pursuant to 35 U.S.C. §119(a), this application claims the benefit of earlier filing date and right of priority to Korean Application No. 10-2013-0011662, filed on Feb. 1, 2013, the contents of which are hereby incorporated by reference herein in their entirety.

BACKGROUND OF THE INVENTION

1. Field of the Invention

The present invention relates to dual mobiles terminal that are attachable and detachable.

2. Discussion of the Related Art

Generally, terminals can be classified into mobile terminals and stationary terminals. In addition, the mobile terminals can be further classified into handheld terminals and vehicle mount terminals. Further, a mobile terminal can perform various functions such as data and voice communications, capturing images and video via a camera, recording audio, playing music files and outputting music via a speaker system, and displaying images and video on a display.

However, the mobile terminal is small in size and thus it is difficult to view movies, play games, etc. There are also other disadvantages to related art mobile terminals. The user also often has multiple mobile terminals (e.g., an office and personal phone, multiple phones in one family, etc.). However, the multiple mobile terminals cannot efficiently be used together.

SUMMARY OF THE INVENTION

Accordingly, the present invention is directed to attachable/detachable dual mobile terminals that substantially obviate one or more problems due to limitations and disadvantages of the related art.

An object of the present invention is to provide attachable/detachable dual mobile terminals that are able to implement unlocking in various methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a detachable dual mobile terminal includes a pair of mobile terminals comprising display units arranged on front sides and input units, respectively; a coupling portion provided in a predetermined side of at least one mobile terminal to attach or detach the mobile terminals to or from each other; a coupling sensor configured to sense whether the mobile terminals are coupled or detached; a short-range wireless communication module configured to enable the mobile terminals to transmit and receive data; and a controller configured to activate the mobile terminals when an unlocking a code is input via the input units in a state of the mobile terminals coupled to each other.

The input unit may be a touch sensor disposed on the display unit, and the unlocking a code may be a preset pattern or characters or numbers input by touching the display unit.

The controller may control the display unit to display an unlocking screen, when the sensor senses conversion from coupled mobile terminals into detached mobile terminals.

The controller may unlock a locked state of the mobile terminal arranged in the other side, when the coupling sensor senses conversion from detached mobile terminal into coupled mobile terminals when only one mobile terminal arranged in one side is unlocked.

The controller may unlock both of the mobile terminals, when an unlocking a code is input to at least one mobile terminal when the coupling sensor senses that the mobile terminals are coupled to each other.

The controller may be provided with a dual mode unlocking a code that is different from individual unlocking codes for the pair of the mobile terminals and may unlock both of the mobile terminals based on the dual mode unlocking a code simultaneously, when the coupling sensor senses that the pair of the mobile terminals are coupled to each other.

The mode unlocking a code may use both of the input units provided in the pair of the mobile terminals.

The mode unlocking a code may be combination of the unlocking codes set for the pair of the mobile terminals.

When coupling sensor senses that the mobile terminals are detached from each other, the controller may unlock a locked state of one mobile terminal arranged one side when a unlocking a code for one mobile terminal provided in one side is input, and the controller may unlock a locked state of the mobile terminal arranged in the other side when an unlocking a code for the other mobile terminal arranged in the other side is input to the mobile terminal arranged in the other side.

When coupling sensor senses that the pair of the mobile terminals are detached from each other, with the same unlocking a code, the controller may unlock locked states of the mobile terminals when the unlocking a code is input to at least one mobile terminal.

The coupling portion may be a magnet.

The coupling portion may be positioned in a lateral side of the mobile terminal.

When one mobile terminal arranged in one side can implement data communication, the mobile terminal arranged in one side may be tethering to extend a data communication function for the mobile terminal arranged in the other side.

According to at least one of the embodiments may be provided various methods for unlocking the locked state by implementing the unlocking between the detachable dual mobile terminals in communication.

Effects and/or advantages obtainable from the present invention are non-limited the above mentioned effect. In addition, other unmentioned effects and/or advantages can be clearly understood from the following description by those having ordinary skill in the technical field to which the present invention pertains.

BRIEF DESCRIPTION OF THE DRAWINGS

The embodiments will be described in detail with reference to the following drawings in which like reference numerals refer to like elements wherein.

DESCRIPTION OF SPECIFIC EMBODIMENTS

In the following detailed description, reference is made to the accompanying drawing figures which form a part hereof, and which show by way of illustration various embodiments.

As used herein, the suffixes 'module', 'unit' and 'part' are used for elements in order to facilitate the invention only. Therefore, significant meanings or roles are not given to the suffixes themselves and it is understood that the 'module', 'unit' and 'part' can be used together or interchangeably.

Figure 1:
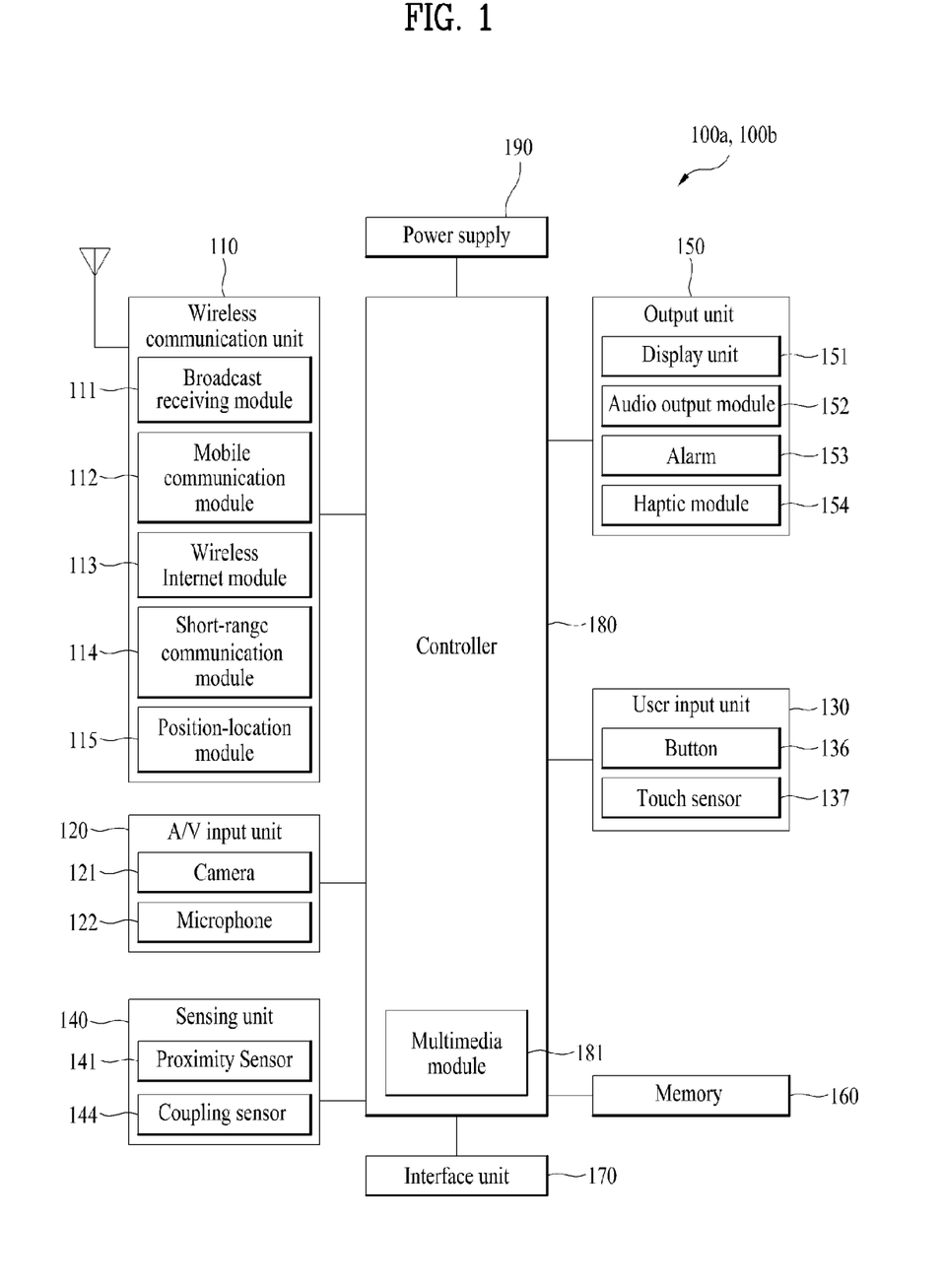
FIG. 1 is a block diagram of a mobile terminal according to an embodiment of the present invention.

FIG. 1 is a block diagram of mobile terminals 100a and 100b according to one embodiment of the present invention. The mobile terminal 100a and 100b is configured of the attached and detached. The block diagram of FIG. 1 shows the device provided in one mobile terminal and the dual mobile terminals 100a and 100b may be provided in predetermined parts or overall parts shown in the block diagram.

The mobile terminal 100a, 100b may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100a, 100b having various components, implementing all of the illustrated components is not a requirement. Greater or fewer components may alternatively be implemented.

In the following description, the above elements of the mobile terminal 100a, 100b are explained in sequence.

First of all, the wireless communication unit 110 typically includes one or more components which permit wireless communication between the mobile terminal 100a, 100b and a wireless communication system or network within which the mobile terminal 100a, 100b is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100a, 100b in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100a, 100b. This module may be internally or externally coupled to the mobile terminal 100a, 100b. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100a, 100b. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 may be configured to provide audio or video signal input to the mobile terminal 100a, 100b. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100a, 100b according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100a, 100b and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100a, 100b using status measurements of various aspects of the mobile terminal 100a, 100b. For instance, the sensing unit 140 may detect an open/close status of the mobile terminal 100a, 100b, relative positioning of components (e.g., a display and keypad) of the mobile terminal 100a, 100b, a change of position of the mobile terminal 100a, 100b or a component of the mobile terminal 100a, 100b, a presence or absence of user contact with the mobile terminal 100a, 100b, orientation or acceleration/deceleration of the mobile terminal 100a, 100b. In a non-limiting example, such a sensing unit 140 may include, a gyro sensor, an acceleration sensor, a geomagnetic sensor and the like.

As an example, consider the mobile terminal 100a, 100b being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100a, 100b. For instance, if the mobile terminal is operating in a phone call mode, the display may provide a user interface (UI) or graphical user interface (GUI) which includes information associated with placing, conducting, and terminating a phone call. As another example, if the mobile terminal 100a, 100b is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100a, 100b may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 may be provided to the mobile terminal 100a, 100b in accordance with the implemented configuration of the mobile terminal 100a, 100b. For instance, a plurality of displays can be arranged on a single face of the mobile terminal 100a, 100b in a manner of being spaced apart from each other or being built in one body. Alternatively, a plurality of displays can be arranged on different faces of the mobile terminal 100a, 100b.

When the display 151 and the touch sensor 137 configures a mutual layer structure (hereinafter called 'touch screen'), it can use the display 151 as an input device as well as an output device. In this instance, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
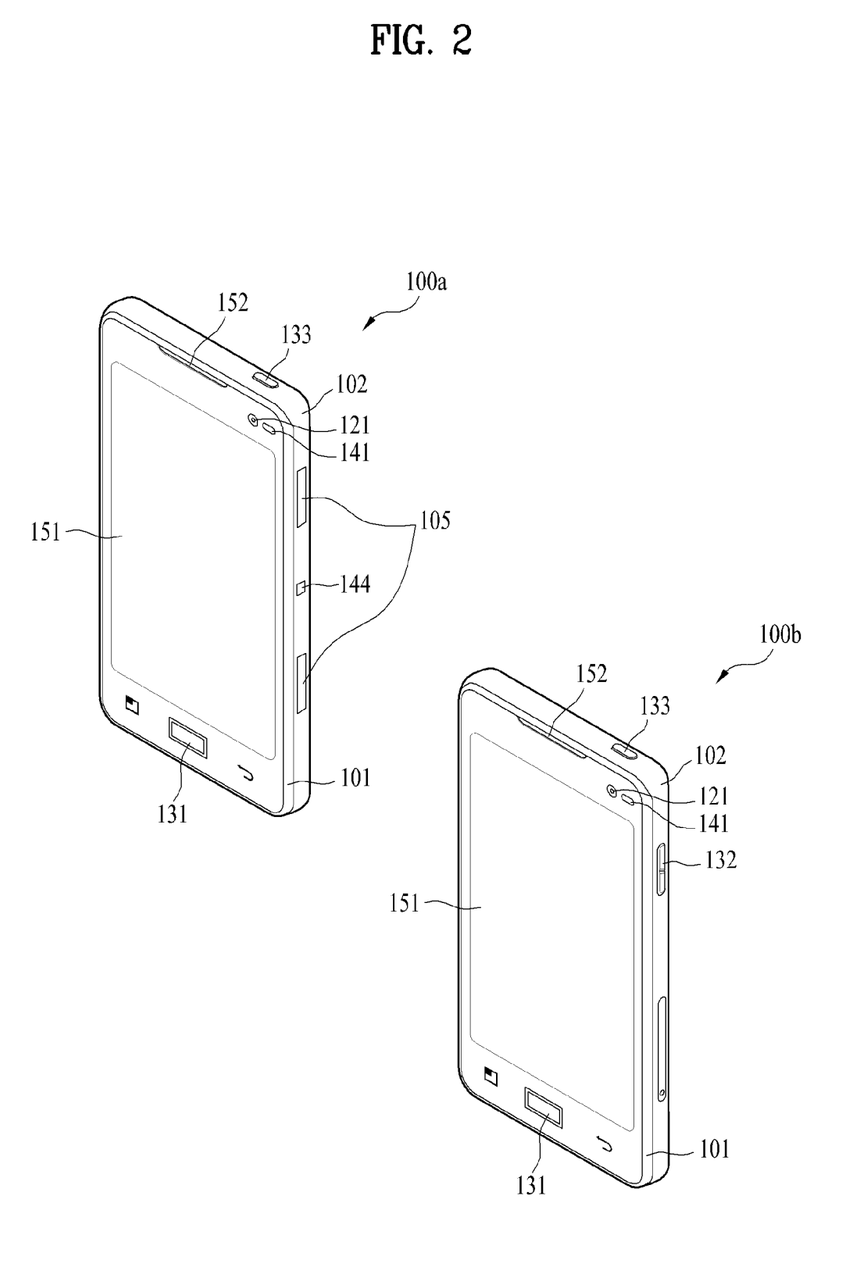
FIG. 2 is a front perspective diagram of a mobile terminal according to one embodiment of the present invention.

Referring to FIGS. 1 and 2, the proximity sensor 141 can be provided to an internal area of the mobile terminal 100a, 100b enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100a, 100b. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100a, 100b in accordance with the corresponding configuration type of the mobile terminal 100a, 100b.

The memory unit 160 is generally used to store various types of data to support the processing, control, and storage requirements of the mobile terminal 100a, 100b. Examples of such data include program instructions for applications operating on the mobile terminal 100a, 100b, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100a, 100b can operate in association with a web storage for performing a storage function of the memory 160 on Internet.

The interface unit 170 is often implemented to couple the mobile terminal 100a, 100b with external devices. The interface unit 170 receives data from the external devices or is supplied with the power and then transfers the data or power to the respective elements of the mobile terminal 100a, 100b or enables data within the mobile terminal 100a, 100b to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100a, 100b and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100a, 100b via the corresponding port.

When the mobile terminal 100a, 100b is connected to an external cradle, the interface unit 170 becomes a passage for supplying the mobile terminal 100a, 100b with a power from the cradle or a passage for delivering various command signals input from the cradle by a user to the mobile terminal 100a, 100b. Each of the various command signals input from the cradle or the power can operate as a signal enabling the mobile terminal 100a, 100b to recognize that it is correctly loaded in the cradle.

The controller 180 may control the overall operations of the mobile terminal 100a, 100b. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100a, 100b. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of the detachable dual mobile terminal 100a and 100b according to one embodiment of the present invention. The detachable dual mobile terminal includes a pair of mobile terminals 100a and 100b that are detachable.

As shown in FIG. 2, the pair of the mobile terminals 100a and 100b may have the same size and appearance or different sizes and appearances, respectively. For example, a mobile terminal 100a provided in one side has a dimension ratio of 3:4 or 3:5.

Moreover, the pair of the mobile terminals may have the same performance. Optionally, only one mobile terminal 100a provided in one side may have specific functions and the other mobile terminal 100b may not have the specific functions and use the specific functions via the mobile terminal 100a. For example, when one mobile terminal can implement data communication, the mobile terminal is tethering to extend the other mobile terminal to have the data communication function.

Here, both of the mobile terminals are provided with the display units 151 for an output function and the audio output modules as terminals, respectively. In addition, the mobile terminals are provided with at least one of the buttons for inputting and the touch sensors 137, respectively. The short-range wireless communication module 114 may be provided in each of the mobile terminals to transmit and receive signals and the other mobile communication modules may be provided in one or both of the mobile terminals.

Referring to FIG. 2, the mobile terminal 100a, 100b includes a case 101, 102, 103 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 configured to cover the surface of the rear case 102. In particular, the backside cover 103 has a detachable configuration for the user's convenience. If the backside cover 103 is detached from the rear case 102, the surface of the rear case 102 is exposed.

The cases 101, 102 and 103 can be formed by injection molding of synthetic resin or can be formed of metal substance such as stainless steel (STS), titanium (Ti) or the like for example.

The detachable dual type mobile terminal 100a and 100b may include a coupling portion 105 to couple the pair of the mobile terminals to each other. As shown in FIG. 2, the coupling portion 105 may be provided in a lateral side to couple the mobile terminals to each other side by side or in a back side to couple the mobile terminals back to back.

The coupling portion 105 may be a structure that mechanically or magnetically couples the mobile terminals to each other. The coupling portion 105 may also be provided in each of the mobile terminals. In case of using a magnet, a magnetic coupling portion 105 may be provided in one mobile terminal and a material receiving from the magnet may be provided in the other mobile terminal. In this instance, the other mobile terminal 100b may be connected to the mobile terminal 100a in four lateral sides or a back side.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100a, 100b. In addition, the input unit 130 can include a plurality of manipulating units 131 and 132. The manipulating units 131 and 132 can be named a manipulating portion and may adopt any mechanism of a tactile manner that enables a user to perform in a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be input by a user's touch.

A coupling sensor 144 is configured to sense whether the pair of the mobile terminals 100a and 100b are coupled or separated to or from each other. In the drawing, a proximity sensor positioned adjacent to the coupling portion 105. However, the coupling sensor 144 according to an embodiment of the present invention is not limited thereto and it may be a switch type sensor that can be pushed when the mobile terminals are coupled or a sensor that can sense whether the mobile terminals are coupled based on an intensity of a signal sensed via wireless communication.

Figure 3:
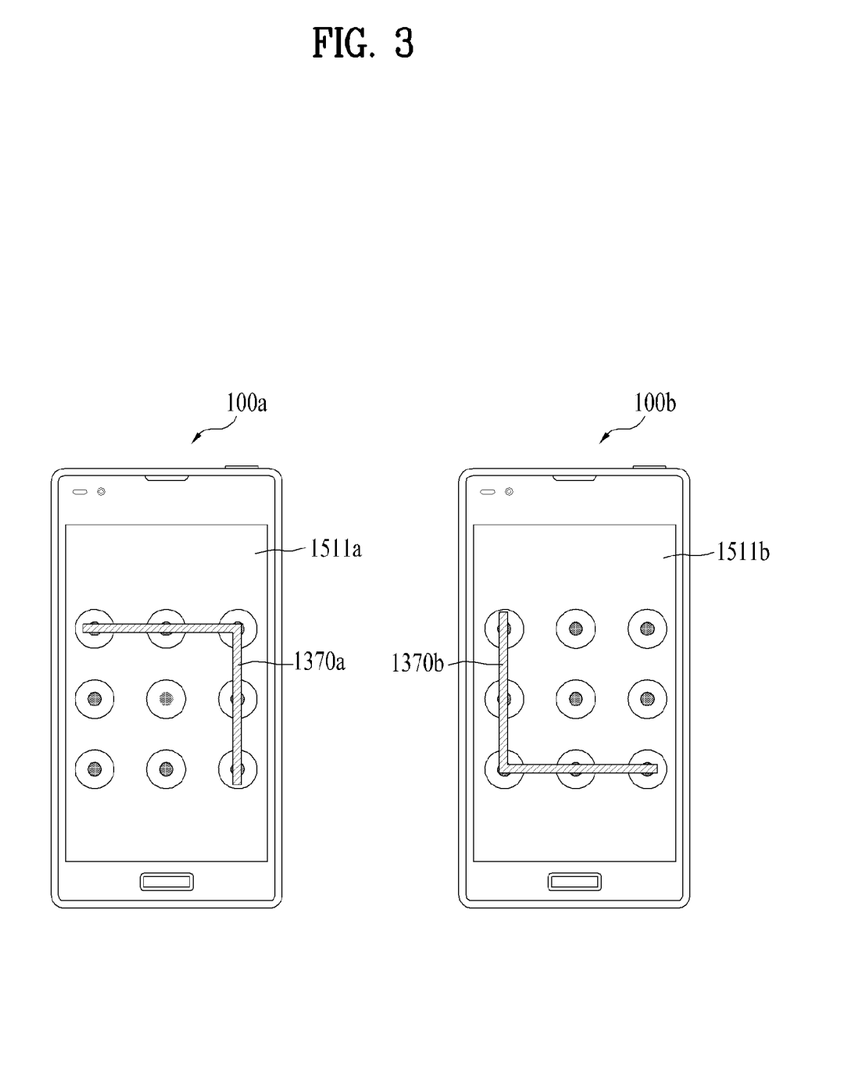
FIG. 3 is a plane diagram illustrating one embodiment of a unlocking a code for detachable dual mobile terminals according to an embodiment of the present invention.

FIG. 3 is a plane diagram illustrating one embodiment of an unlocking a code for detachable dual mobile terminals according to an embodiment of the present invention. "Unlocking" is performed when the mobile terminals are not currently being used, for example. The unlocking is released when an unlocking code is input and the mobile terminals are activated to make functions thereof be useable.

A locked state is configured to prevent a third person from using the mobile terminal his or her own way so as to protect the personal privacy. As the functions of the mobile terminal are diversified, there may be further provided functions of memorandums or messages rather than a simple function of making a call. When the mobile terminal is not used, with an accredited certificate stored therein, the mobile terminal can be in the locked state to prevent damage generated by private information exposure.

Such an unlocking a code may include various types. Examples of the various types may include a pattern or figure for connecting specific buttons, a character combination of numbers or letters, a specific motion using a motion sensor. This embodiment proposes a pattern created by connecting specific buttons as the unlocking a code and the present invention is not limited thereto.

The same unlocking a code may be set in the pair of the mobile terminals or a different unlocking a code may be set in each of the mobile terminals. In the embodiment shown in FIG. 3, the pair of the mobile terminals may have different unlocking codes, respectively, that are different from each other. The mobile terminal 100a provided in one side has a first unlocking a code 1370a that is '┐'-shaped pattern and the mobile terminal 100b provided in the other side has a second unlocking a code 1370b that is 'L'-shaped pattern. The user can also set what pattern is to be used to unlock the mobile terminals.

Figure 4:
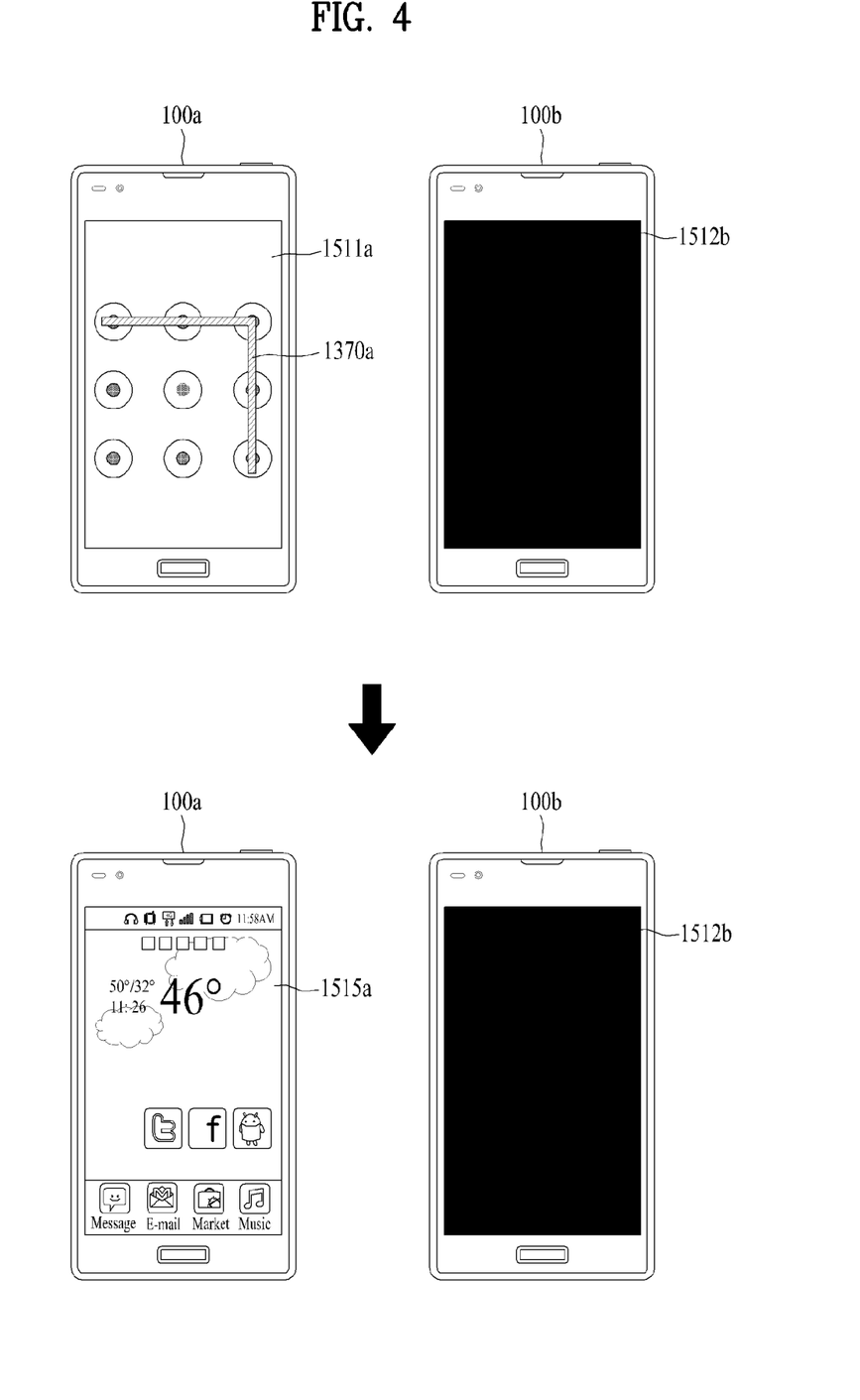
FIGS. 4 and 5 are plane diagrams illustrating one embodiment of a method for unlocking when the detachable dual mobile terminals are detached.
Figure 5:
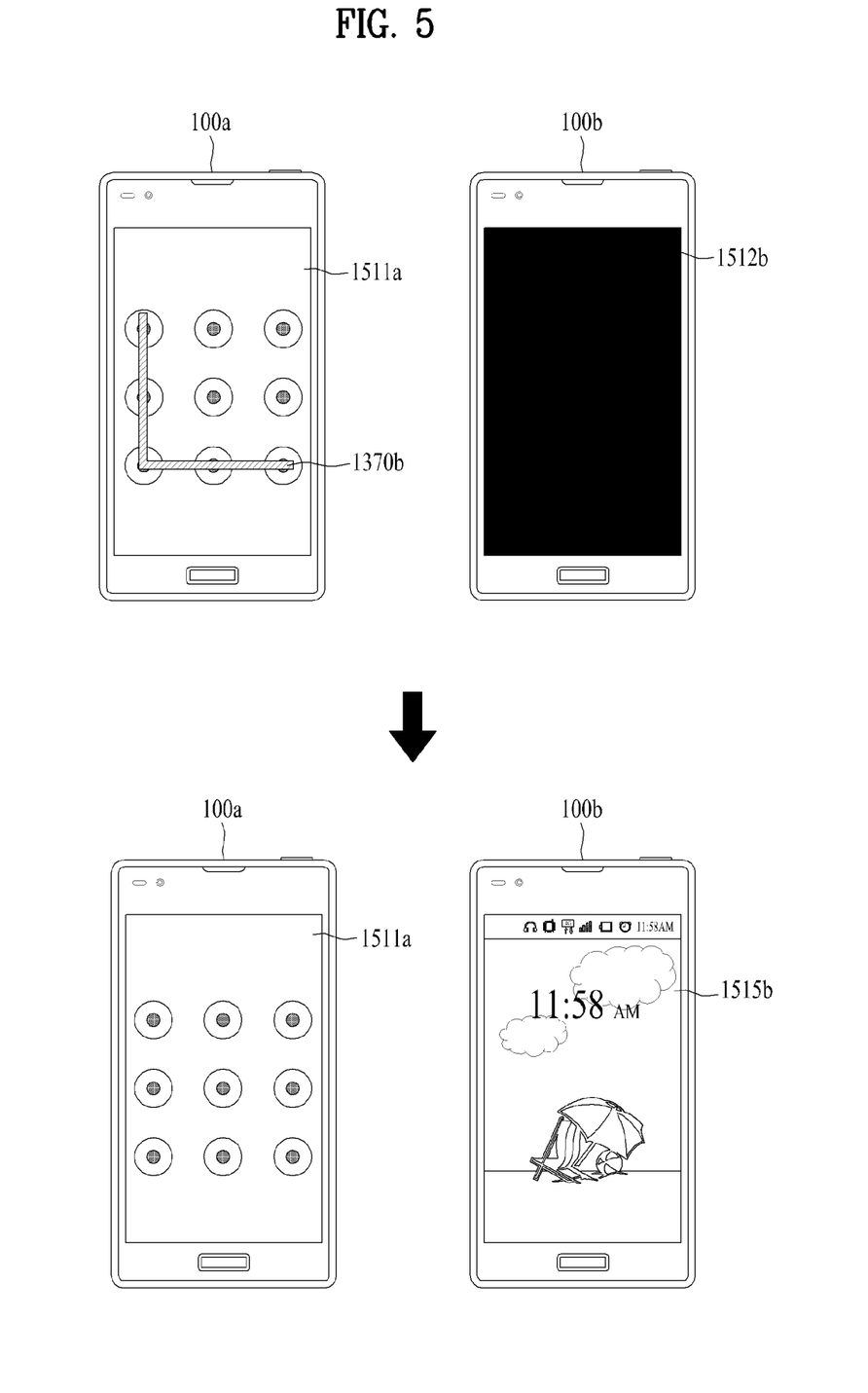

Next, FIGS. 4 and 5 are plane diagrams illustrating one embodiment of a method for unlocking the mobile terminals when the detachable dual mobile terminals 100a and 100b are detached. As shown in FIG. 4, a screen 1511a is provided in the display unit of the mobile terminal 100a provided in one side and an unlocking code for releasing the locked state may be input to the screen 1511a.

At this time, the mobile terminal 100b provided in the other side is not used by the user and the locked state thereof is maintained (as shown by the dark or locked screen 1512b). When the first unlocking code 1370a is input to the mobile terminal 100a provided in one side, only the locked state of the mobile terminal 100a is unlocked and the mobile terminal 100a is activated. In contrast, the locked state of the mobile terminal 100b provided in the other side is maintained.

As shown in FIG. 5, when the second unlocking code 1370b for unlocking the locked state of the mobile terminal 100b is input to the unlocking code input screen 1511a, the locked state of the mobile terminal 100b provided in the other side is unlocked (as shown by the unlocked screen 1515b).

At this time, the screen 1511a for allowing the user to input the unlocking code thereto may be displayed on the display unit of the mobile terminal 100a provided in one side or the screen may be lost. When mobile terminals 100a and 100b have the unlocking code, it may be set that only the mobile terminal to which the unlocking code is input is unlocked or that both of the mobile terminals are unlocked.

Figure 6:
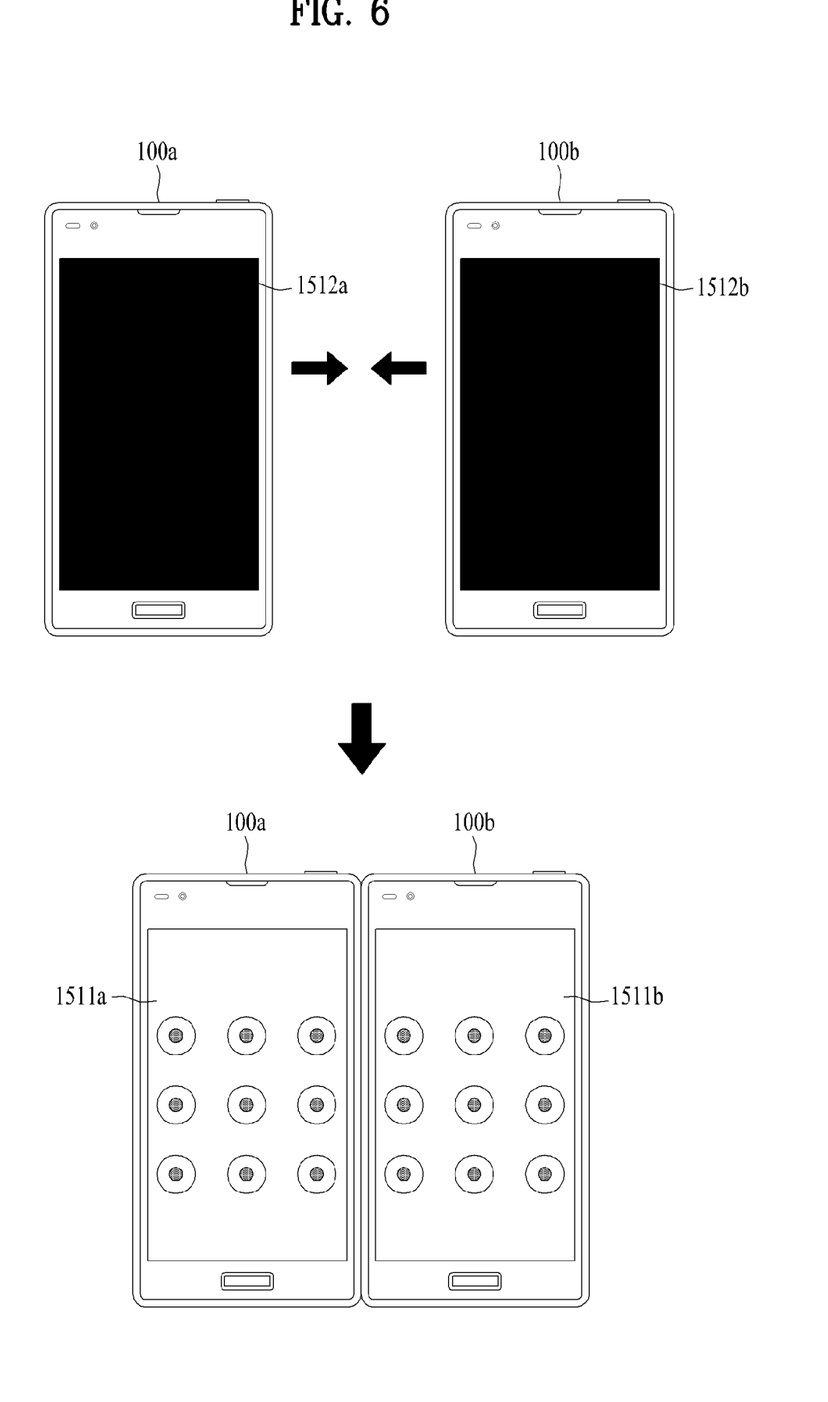
FIGS. 6 and 7 are plane diagrams illustrating one embodiment of a method for unlocking when the detachable dual mobile terminals are coupled to each other.
Figure 7:
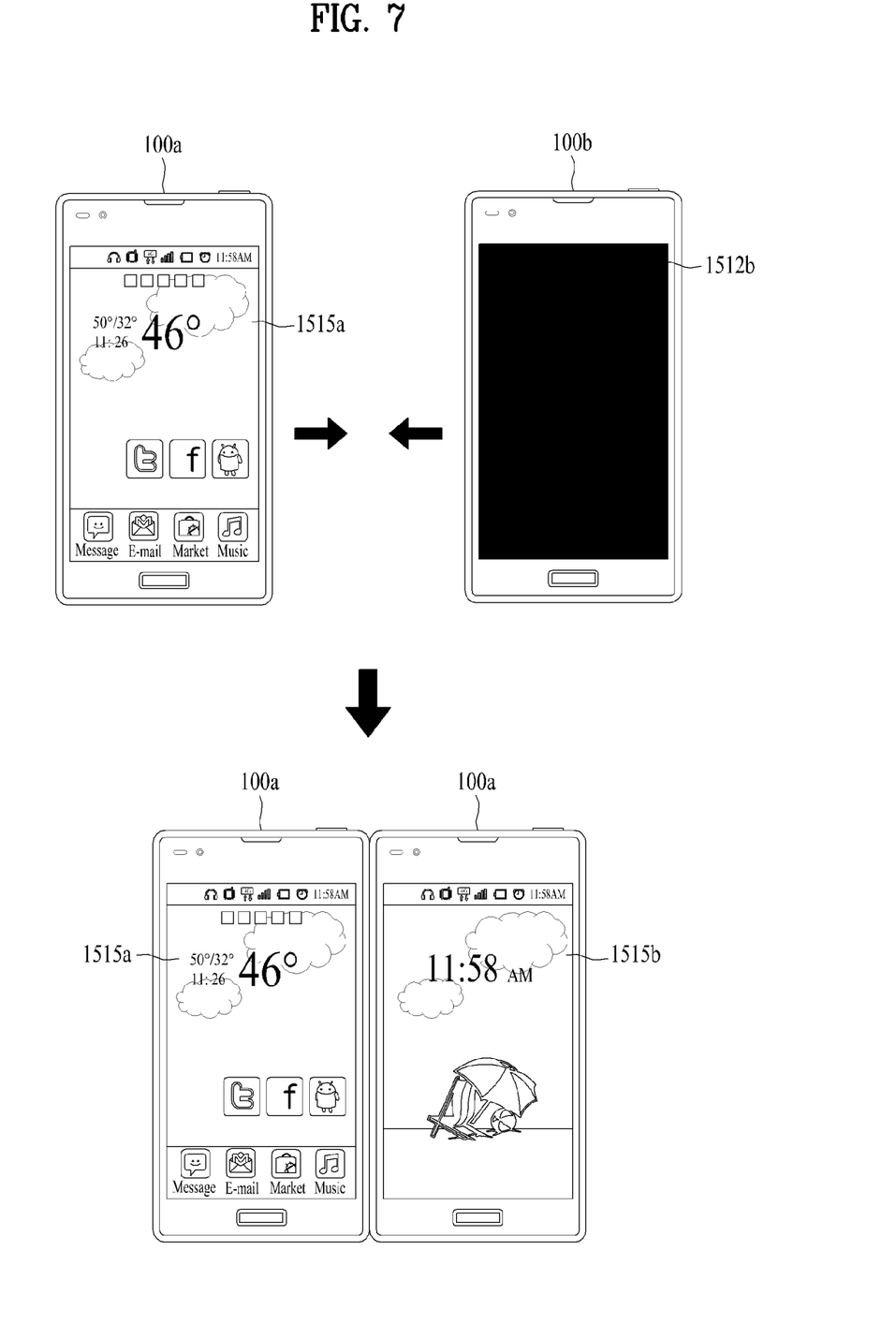

Next, FIGS. 6 and 7 are plane diagrams illustrating one embodiment of a method for unlocking the mobile terminals 100a and 100b coupled to each other. As shown in FIG. 6, when the separated mobile terminals 100a and 100b are coupled to each other, screens 1511a and 1511b for inputting unlocking codes are activated in a locked state. The attaching of the mobile terminals 100a and 100b corresponds to the user using the mobile terminals in a dual state. Accordingly, the unlocking code inputting screens 1511a and 1511b are provided to input unlocking codes so as to activate the pair of the mobile terminals.

As shown in FIG. 7, when the pair of the mobile terminals 100a and 100b are coupled to each other when only the mobile terminal 100a is in the unlocked state (1515a) and the mobile terminal 100b is in the locked state (1512b), both of the mobile terminals are controlled to be in the unlocked state (1515a and 1515b).

Next, FIGS. 8 to 12 are plane diagrams illustrating one embodiment of a method for unlocking the mobile terminals 100a and 100b coupled to each other. FIGS. 8 to 12 show a method for inputting an unlocking a code when the pair of the mobile terminals are coupled to each other.

Figure 8:
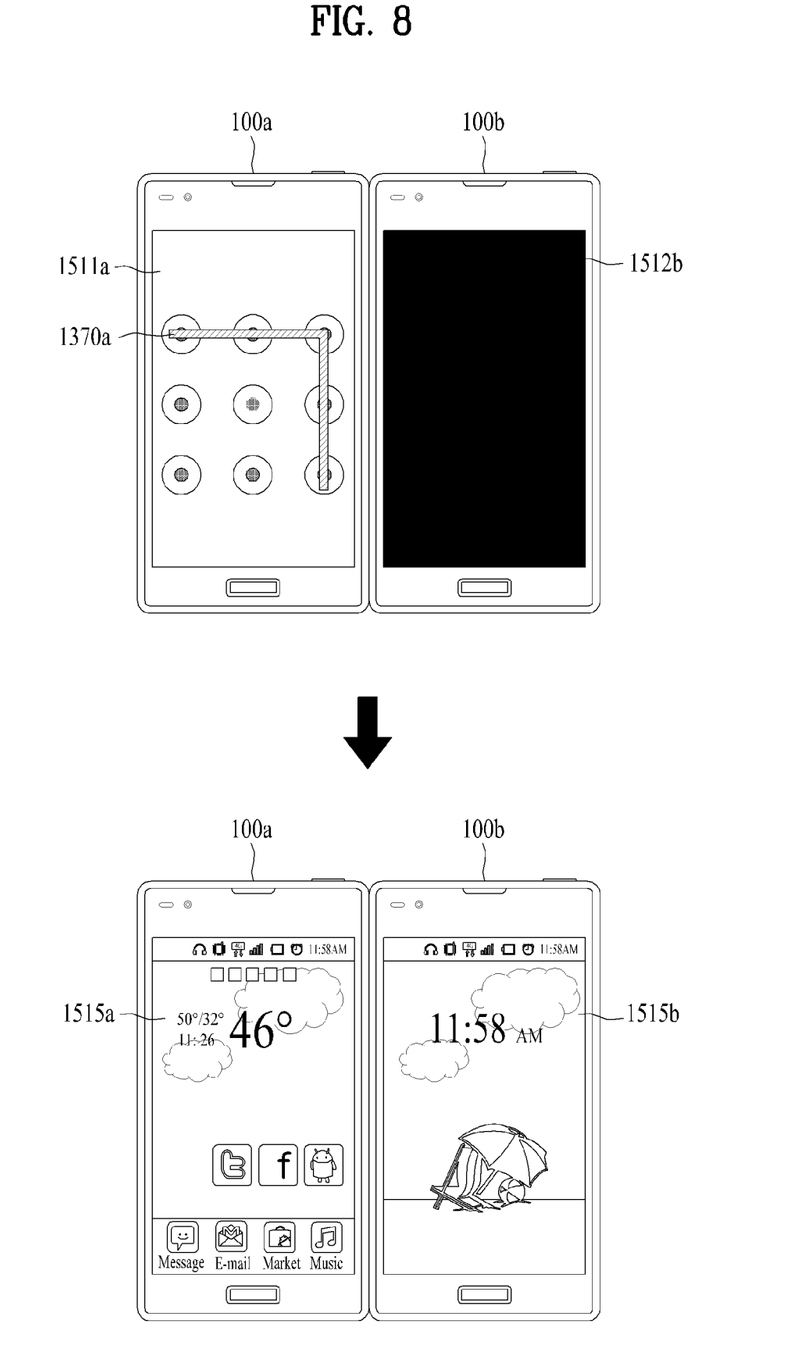
FIGS. 8 to 12 are plane diagrams illustrating one embodiment of a method for unlocking when the detachable dual mobile terminals are coupled to each other.

As shown in FIG. 8, when an unlocking code is input to the mobile terminal 100a coupled to the other mobile terminal 100b, both of the mobile terminals 100a and 100b are controlled to release the locked state. (1515a and 1515b).

Figure 9:
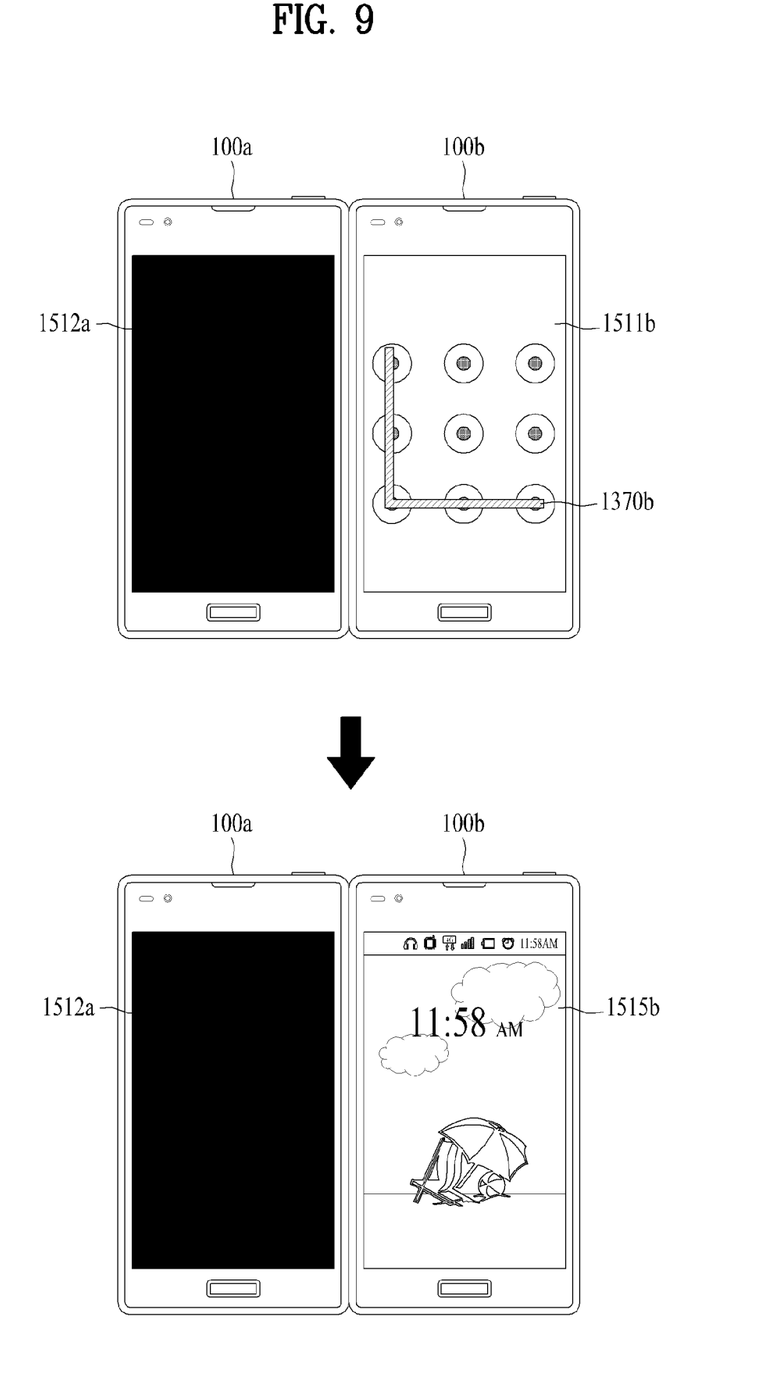

Optionally, as shown in FIG. 9, the mobile terminals 100a and 100b are controlled to release the locked state separately. In other words, when the unlocking code 1370b is input to the mobile terminal 100b, only the locked state of the mobile terminal 100b is unlocked.

Figure 10:
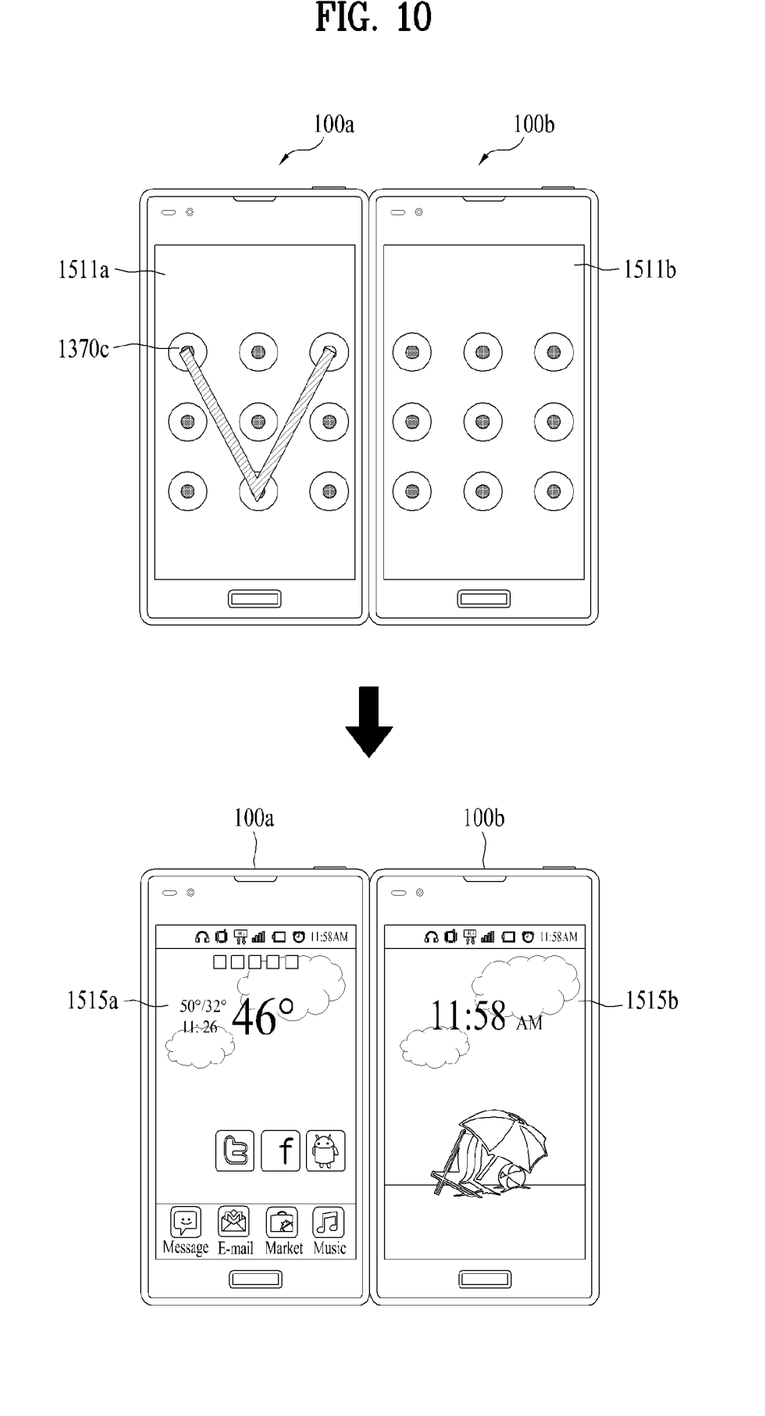
Figure 11:
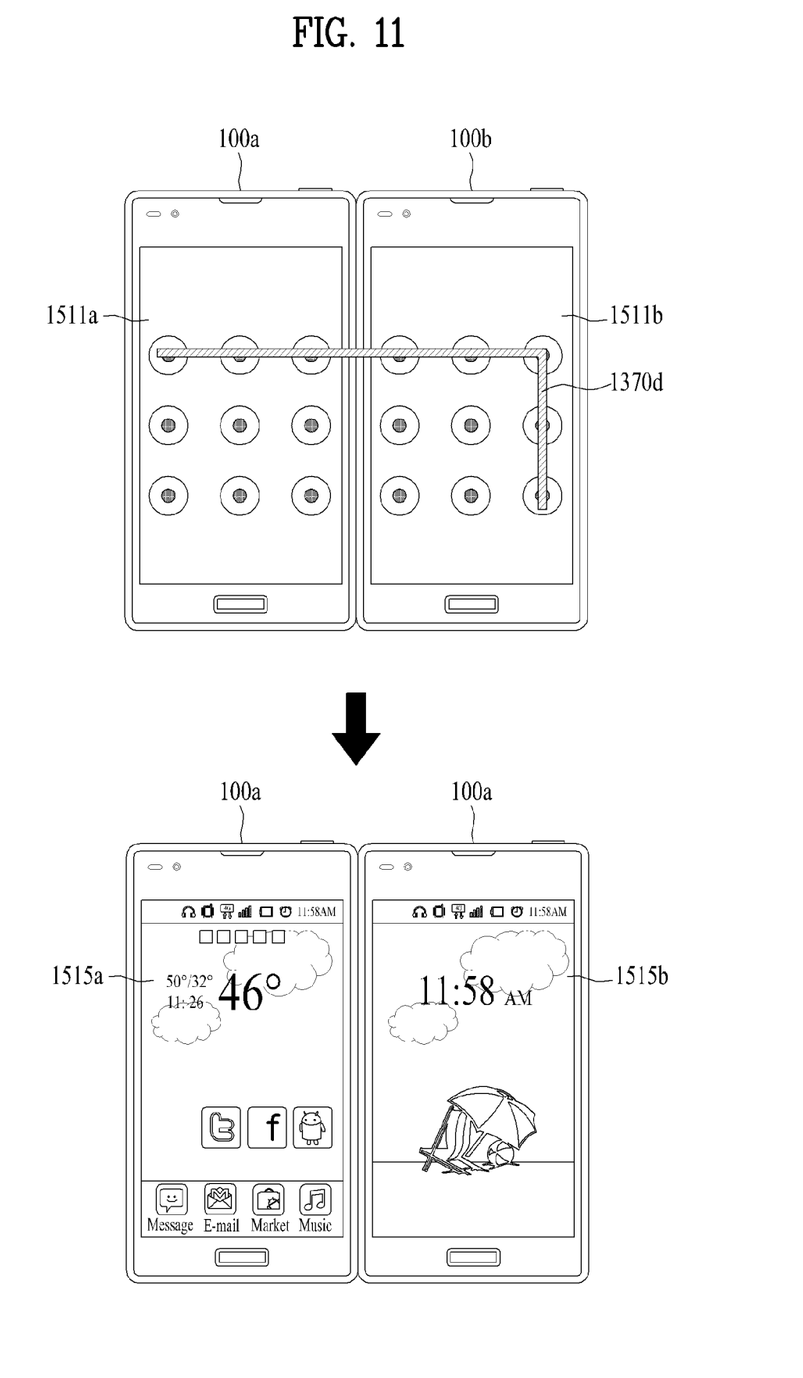
Figure 12:
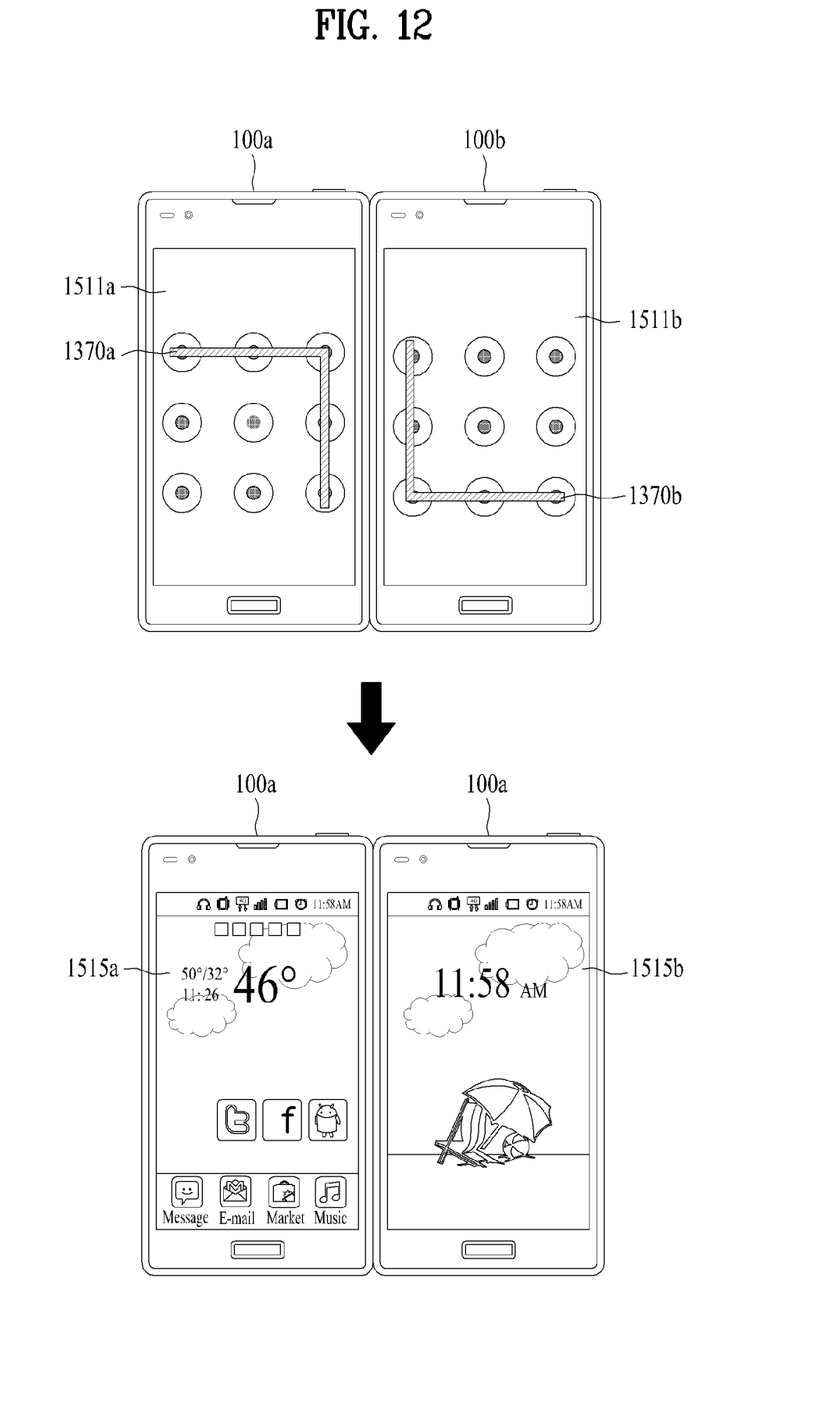

Optionally, as shown in FIGS. 10 to 12, unlocking codes can be set to be different when the mobile terminals are coupled or detached from each other. An unlocking code 1370c when the mobile terminals coupled to each other may be set to be input only to the unlocking code input screen 1511a of the mobile terminal 100a, as shown in FIG. 10. An unlocking code 1370d may be set to be input to both of the unlocking code input screens 1511a and 1511b of the mobile terminals 100a and 100b, as shown in FIG. 11.

Or, as shown in FIG. 12, the locked states of the mobile terminals 100a and 100b may be controlled to be unlocked only when both of the first and second unlocking codes 1370a and 1370b are input when the mobile terminals coupled to each other. In other words, the combination of the unlocking codes 1370a and 1370b for the pair of the mobile terminals 100a and 100b may be the unlocking code for the coupled mobile terminals.

Various variations and modifications are possible in the component parts and/or arrangements of the subject combination arrangement within the scope of the invention, the drawings and the appended claims.

Although embodiments have been described with reference to a number of illustrative embodiments thereof, it should be understood that numerous other modifications and embodiments can be devised by those skilled in the art that will fall within the spirit and scope of the principles of this invention.

What is claimed is:

1. A detachable dual mobile terminal comprising:
a first mobile terminal having a first display unit;
a second mobile terminal having a second display unit;
a coupling portion provided in a predetermined side of at least one of the first and second mobile terminals to couple or detach the first and second mobile terminals to or from each other;
a coupling sensor included in at least one of the first and second mobile terminals and configured to sense whether the first and second mobile terminals are coupled or detached;
first and second short-range wireless communication modules respectively included in the first and second mobile terminals and configured to transmit and receive data; and a controller included in each of the first and second mobile terminals and configured to unlock the second mobile terminal in case of satisfying a first condition or a second condition, wherein the first condition is that an unlocking code is input to the first mobile terminal while the coupling sensor senses the coupling of the first mobile terminal and the second mobile terminal, and wherein the second condition is that the coupling sensor senses the coupling of the first mobile terminal and the second mobile terminal while the first mobile is unlocked.

2. The detachable dual mobile terminal according to claim 1, wherein the unlocking code is a preset pattern or characters or numbers input by touching the first display unit.

3. The detachable dual mobile terminal according to claim 1, wherein the controller is further configured to display an unlocking screen on at least one of the first and second display units, when the coupling sensor senses the first and second mobile terminals are detached from each other.

4. The detachable dual mobile terminal according to claim 1, wherein the controller of the first and second mobile terminals includes a dual mode unlocking code that is different from individual unlocking codes for the first and second mobile terminals and is configured to unlock both of the first and second mobile terminals when the dual mode unlocking code is input on at least one of the first and second mobile terminals and when the coupling sensor senses the first and second mobile terminals are coupled to each other.

5. The detachable dual mobile terminal according to claim 4, wherein the dual mode unlocking code is input across both of the first and second mobile terminals.

6. The detachable dual mobile terminal according to claim 4, wherein the dual mode unlocking code is a combination of the individual unlocking codes for the first and second mobile terminals.

7. The detachable dual mobile terminal according to claim 1, wherein when the coupling sensor senses the first and second mobile terminals are detached from each other, the controller is further configured to unlock the first mobile terminal when a unlocking code for the first mobile terminal is input on any one of the first and second mobile terminals, and unlock a locked state of the second mobile terminal when an unlocking code for the second mobile terminal is input on any one of the first and second mobile terminals.

8. The detachable dual mobile terminal according to claim 1, wherein when the coupling sensor senses that the first and second mobile terminals are detached from each other and have the same unlocking code, the controller is further configured to unlock locked states of the first and second mobile terminals when the unlocking code is input on any one of the first and second mobile terminals.

9. The detachable dual mobile terminal according to claim 1, wherein the coupling portion is a magnet.

10. The detachable dual mobile terminal according to claim 1, wherein the coupling portion is positioned in a lateral side of the mobile terminal.

11. The detachable dual mobile terminal according to claim 1, wherein when the first mobile terminal is configured to implement data communication, the second mobile terminal tethers the first mobile terminal to extend a data communication function.

12. A mobile terminal comprising:
a display unit;
a coupling portion provided in a predetermined side of the mobile terminal and configured to couple or detach the mobile terminal to another mobile terminal;
a coupling sensor configured to sense whether the mobile terminal is coupled or detached to the other mobile terminal;
a short-range wireless communication module configured to transmit and receive data; and
a controller configured to cooperate with a controller of the other mobile terminal to unlock the other mobile terminal in case of satisfying a first condition or a second condition,
wherein the first condition is that an unlocking code is input while the coupling sensor senses the coupling with the other mobile terminal, and
wherein the second condition is that the coupling sensor senses the coupling with the other mobile terminal while the mobile is unlocked.

13. The mobile terminal according to claim 12, wherein the unlocking code is a preset pattern or characters or numbers input by touching the display unit of the mobile terminal.

14. The mobile terminal according to claim 12, wherein the controller is further configured to display an unlocking screen on display unit, when the coupling sensor senses the mobile terminals are detached from each other.

15. The mobile terminal according to claim 12, wherein the controller includes a dual mode unlocking code that is different from an individual unlocking code for the mobile terminal and is configured to unlock both mobile terminals when the dual mode unlocking code is input on the mobile terminal and when the coupling sensor senses the mobile terminals are coupled to each other.

16. The mobile terminal according to claim 15, wherein the dual mode unlocking code is input across both mobile terminals.

* * * * *